United States Patent Office 2,943,043
Patented June 28, 1960

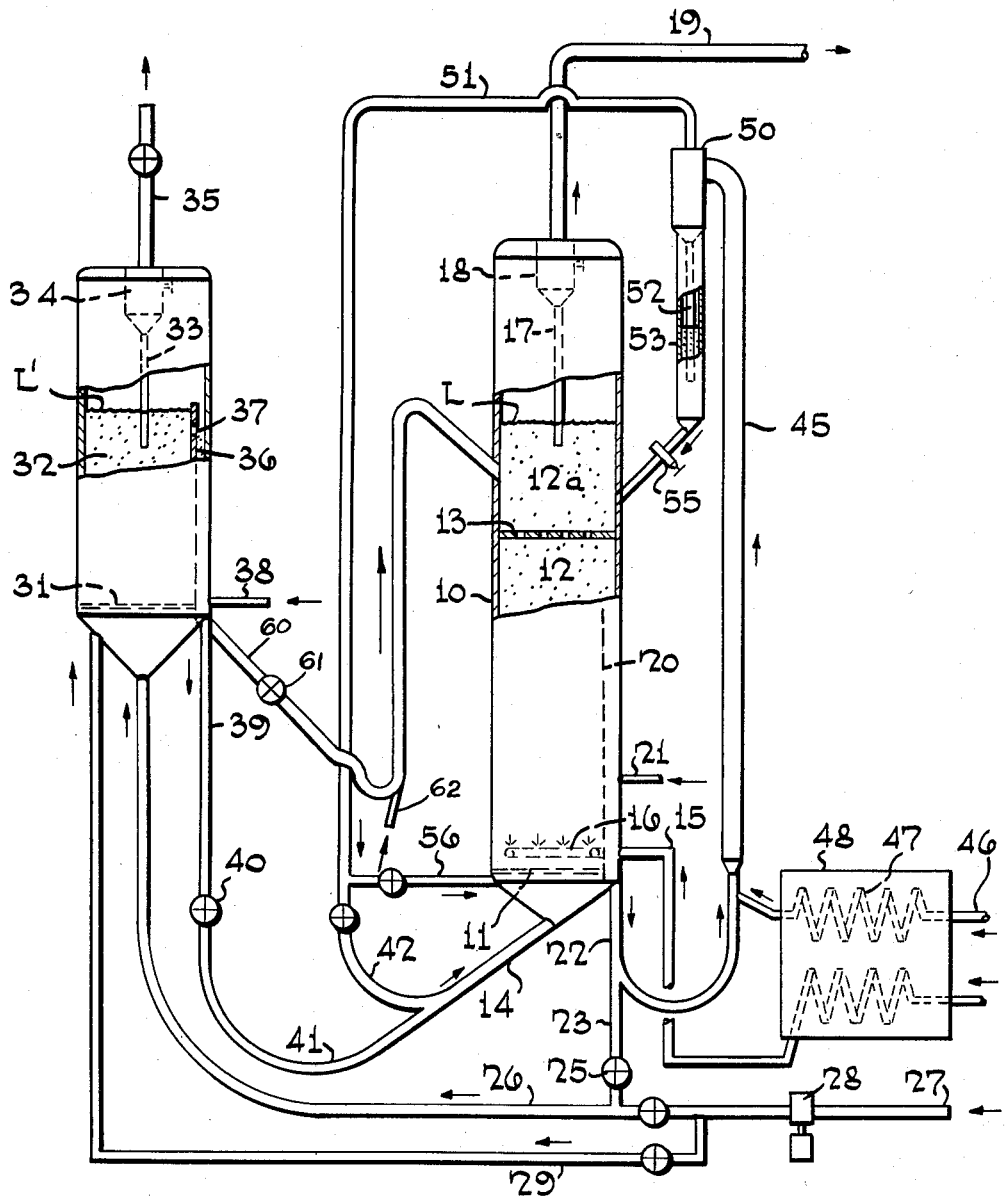

2,943,043

HYDROFORMING PROCESS WITH TEMPERATURE CONTROL OF THE REACTION BY INDIRECT HEAT EXCHANGE

William J. Sweeney, Summit, N.J., assignor to Esso Research and Engineering Company, a corporation of Delaware Filed Feb. 2, 1953, Ser. No. 334,529

10 Claims. (Cl. 208—134)

This invention relates to the catalytic conversion of hydrocarbon fractions boiling within the motor fuel range of low knock rating into high octane number motor fuel rich in aromatics and particularly to a process whereby such conversion is effected by the fluidized solids technique.

Hydroforming is a well known and widely used process for treating hydrocarbon fractions boiling within the motor fuel or naphtha range to upgrade the same or increase the aromaticity and improve the anti-knock characteristics of said hydrocarbon fractions. By hydroforming is ordinarily meant an operation conducted at elevated temperatures and pressures in the presence of solid catalyst particles and hydrogen whereby the hydrocarbon fraction is increased in aromaticity and in which operation there is no net consumption of hydrogen. Hydroforming operations are ordinarily carried out in the presence of hydrogen or a hydrogen-rich recycle gas, i.e. at relatively high hydrogen partial pressure, in the pressure range of about 50–1000 lbs. per sq. inch, at temperatures of about 750–1150° F. and in contact with such catalysts as platinum or palladium upon a support such as alumina, molybdenum oxide, chromium oxide, or, in general, oxides or sulfides of metals of groups IV, V, VI, VII and VIII of the periodic system of elements, alone, or generally supported on a base or spacing agent such as alumina gel, precipitated alumina or zinc aluminate spinel. A good hydroforming catalyst is one containing about 10 wt. percent molybdenum oxide upon an aluminum oxide base prepared by heat treating a hydrated aluminum oxide to convert it to activated alumina or upon a zinc aluminate spinel. A good precious metal catalyst is one consisting of about 0.5 wt. percent platinum upon alumina, preferably an alumina prepared by hydrolysis of an aluminum alkoxide such as aluminum amylate.

It has been proposed to effect the hydroforming of naphtha fractions in a fluidized solids reactor system in which naphtha vapors are passed continuously through a dense, fluidized bed of hydroforming catalyst particles in a reaction zone, spent catalyst particles are withdrawn from the dense bed in the reaction zone and passed to a separate regeneration zone where inactivating carbonaceous deposits are removed by combustion whereupon the regenerated catalyst particles are returned to the main reactor vessel or hydroforming reaction zone. Fluid hydroforming as thus conducted has several fundamental advantages over fixed bed hydroforming such as (1) the operations are continuous, (2) the vessels can be designed for single rather than dual functions, (3) the reactor temperature is substantially constant throughout the dense bed and (4) the regeneration or reconditioning of the catalyst may be readily controlled.

An advantage of the foregoing fluidized solids operation has been the fact that the freshly regenerated catalyst can be utilized to carry part of the heat required for the hydroforming reaction from the regeneration zone into the reaction zone. It has been proposed in this connection to discharge hot, freshly regenerated catalyst particles into a stream of hot hydrogen-rich recycle gas in a transfer line whereby the catalyst particles are subjected to a reconditioning treatment during their passage through the transfer line into the reactor. This reconditioning or pretreatment of the regenerated catalyst involves at least a partial reduction of higher catalytic metal oxides, formed during regeneration, to a lower or more catalytically active form of catalytic metal oxide. In view of the high temperature of the regenerated catalyst (1050–1200° F.) and the exothermic character of the reaction between the hot, freshly regenerated catalyst and the hydrogen, it is necessary to make the transfer line very short and of small diameter in order to keep the time of contact of the freshly regenerated catalyst and the hydrogen-containing gas sufficiently short to avoid overtreatment and/or thermal degradation of the catalyst. It has been proposed to alleviate this problem by mixing recycle reactor catalyst with the freshly regenerated catalyst to lower and control the temperature of pretreatment while simultaneously recovering the sensible heat of the regenerated catalyst as well as the heat released by the partial reduction to the catalytic metal oxides for use in the main or hydroforming reaction zone.

This expedient permits the recovery of a substantial amount of heat for use in the hydrocarbon conversion. However, the total amount of heat that may be recovered and supplied to the reaction zone by the catalyst is limited by the low catalyst to oil ratios that must ordinarily be maintained in reforming reactions because of selectivity considerations. The reforming or hydroforming reaction is highly endothermic and, therefore, there is a natural tendency for the temperature to drop as the feed passes through the reactor. Since the amount of heat that can be introduced by the catalyst is insufficient to carry out the reforming reaction it is common practice to preheat the feed stock and recycle or hydrogen-rich gas to temperatures well above the average reactor temperature to supply the heat necessary for the conversion. This severe preheating has an adverse effect upon selectivity or the yield of desired liquid products since it brings about thermal degradation of the feed as well as some of the higher molecular weight constituents of the recycle gas. Moreover, excessively large amounts of recycle gas must be introduced to carry heat to the conversion zone. This is particularly objectionable in fluid hydroforming because of the fact that in operations at 200 lbs. per sq. in. the superficial velocity of gaseous or vaporous reactants must be held below about one foot per second to avoid excessive entrainment of catalyst from the reactor dense bed. Moreover, supplying hot recycle gas (at or around 1200° F.) at permissible rates or superficial velocities offers the distinct possibility that high temperature gradients or zones of localized overheating will be formed in the reactor dense bed at the point or region where the recycle gas is introduced.

It is the object of this invention to provide the art with an improved method for reforming hydrocarbon fractions by the fluidized solids technique.

It is also the object of this invention to provide the art with a method whereby hydrocarbon fractions can be reformed by the fluidized solids technique without establishing a high temperature gradient in the region where the hydrogen-rich recycle gas is introduced into the reaction zone.

It is a further object of this invention to provide the art with an improved method for reforming hydrocarbon fractions by the fluidized solids technique wherein an inverse temperature gradient or higher average temperature in the final portion of the reaction zone than in the initial portion thereof can be established.

These and other objects will appear more clearly from the detailed specification and claims which follow.

It has now been found that hydrocarbon fractions which boil within the motor fuel or naphtha range can be reformed in an advantageous manner in accordance with the fluidized solids technique if preheated recycle gas is brought into contact with a stream of recycle reactor catalyst in order to heat the catalyst particles well above the average reactor temperature and simultaneously cool the recycle gas to an intermediate temperature level adequate to supply the required heat of reaction but sufficiently low to minimize danger of causing adverse thermal effects in the reaction zone in the region where the recycle gas is introduced. The heated recycle reactor catalyst is separated from the recycle gas and the catalyst and recycle gas are introduced separately into the reactor. In a preferred embodiment, the heated recycle reactor catalyst is discharged into the uppermost bed of a multi bed reactor in order to overcome the drop in temperature that normally tends to occur and thereby maintain an inverse temperature gradient or higher average temperature in the final dense bed or reaction zone through which the reaction mixture passes before it is discharged into the product recovery system. Establishment of a temperature gradient which increases from the inlet to the outlet of the reaction zone or vessel promotes better yields for a given octane number. In accordance with the present invention, heat is supplied to the reaction zone while avoiding the establishment of high temperature gradients within the reaction zone that would normally be set up by the introduction of recycle gas at maximum preheat temperatures of about 1175–1200° F. Moreover, recycling of reactor catalyst with hot recycle gas can serve to effect at least a partial regeneration of the reactor catalyst by hydrogenation of carbonaceous deposits thereon. Considerable flexibility may be provided in the system in accordance with the present invention by passing the mixture of reactor catalyst and recycle gas through a furnace or heat exchanger in order to supply additional heat or the recycle gas may be reheated after separation from the recycle reactor catalyst and before its re-introduction to the reaction zone proper.

Reference is made to the accompanying drawing illustrating one embodiment of the present invention.

In the drawing, 10 is a reactor vessel which may desirably be a vertical cylindrical vessel of considerable length or height and which is provided with perforated distribution plate or grid 11. The reactor vessel is preferably provided with one or more horizontal perforated plates 12 to divide the reactor vessel into two or more zones. The reactor vessel 10 is charged with a hydroforming catalyst such as molybdenum oxide or platinum upon an activated alumina support. The catalyst is in a finely divided form and is maintained as a dense, turbulent fluidized bed 12 and 12a by the passage therethrough of hydrogen rich gas such as recycle gas introduced through inlet line 14 and perforated plate or grid 11 and preheated, vaporized hydrocarbon feed introduced through inlet line 15 and distributor ring 16. The dense, fluidized bed of catalyst has a definite level L and is superposed by a dilute or disperse phase 17 comprising small amounts of catalyst entrained in gaseous or vaporous reaction products. The reaction products are taken overhead from reactor vessel 10, preferably after passage through a cyclone separator 18 or the like which serves to knock out entrained catalyst particles from the outgoing products stream. The separated catalyst particles are returned to the reactor dense bed through the dip leg attached to the bottom of the cyclone separator 18. The reaction products pass overhead through products outlet line 19 to suitable fractionation, stabilization and/or storage equipment.

Means are provided for the withdrawal of catalyst directly from the dense fluidized bed 12. This may be in the form of a cell or conduit arranged externally of the reactor vessel which is connected to the reactor vessel by one or more withdrawal lines or connectors for controlling the discharge of catalyst from the reactor or the withdrawal cell or conduit may be arranged entirely within the reactor as shown at 20 in the drawing. Stripping gas is introduced into the withdrawal conduit at 21 to strip off hydrogen and hydrocarbon. Since steam is commonly used as the stripping medium, it is desirable to vent the stripping gases into the dilute phase 17 in order to minimize contact of the stripping steam with the dense bed 12 and 12a. This can be easily accomplished by extending the conduit 20 upwardly into the dilute phase 17 and providing one or more orifices for the passage of catalyst from the dense bed into the stripping conduit.

The lower end of conduit 20 is connected to conduit 22 which in turn is connected to standpipe 23 for developing the fluistatic pressure required to overcome the pressure drop through the regenerator and to U-bend transfer line 24 for the supply of a stream of reactor catalyst to the recycle system which will be described below. Aeration taps may be provided on standpipe 23 in order to maintain the catalyst particles in fluidized condition. A slide valve 25 or other suitable flow control means is provided in the standpipe 23 to control the discharge of spent catalyst to the regenerator. The spent catalyst is discharged from standpipe 23 into transfer line 26 where it is picked up by a stream of carrier gas. In the arrangement shown, air is used as the carrier gas and in view of the high rate at which carbonaceous deposits burn under the pressures maintained in the system, it is preferred to use only part of the air necessary for regeneration as carrier gas for the spent catalyst. Accordingly, air entering at 27 passes through compressor 28 and then the stream of air is split, a minor part, generally about 15 to 40% of the total air required for regeneration is discharged into transfer line 26 to serve as carrier gas for the spent catalyst while the remainder of the air is passed through line 29 directly to the regenerator 30. A perforated plate or distribution grid 31 is desirably arranged at the bottom of the regenerator vessel in order to insure uniform distribution of the solids and regeneration gas over the entire cross-section of the regenerator vessel.

The velocity of the regeneration gas or air through the regenerator 30 is so controlled as to form a dense, fluidized, liquid simulating bed 32 of catalyst particles and gas having a definite level L' with a dilute or disperse phase 33 comprising small amounts of catalyst entrained in regeneration gases thereabove. The regeneration gases pass overhead from the regenerator 30 through a cyclone separator 34 or the like which removes entrained catalyst from the outgoing gases. The regeneration gases essentially free of catalyst particles are discharged via outlet line 35 through a pressure reducing or control valve to a waste gas stack or to suitable scrubbing and/or storage means if it is desired to use this gas for stripping or other purposes in the system. In view of the amount of combustible material burned during regeneration, it is ordinarily necessary to provide cooling coils in the regenerator to prevent the regenerator temperature from exceeding a safe upper limit. A very desirable arrangement is to provide a primary cooling coil entirely below dense bed level L' and a secondary coil partly below and partly above the dense bed level L' to permit adjustment of the heat exchange capacity by simply varying the dense bed level L' in the regenerator.

Regenerated catalyst is continuously discharged from the dense bed 32 into a suitable stripper. The stripper may be arranged externally of the regenerator vessel with suitable connector conduits for conducting regenerated catalyst into the stripper or it may comprise a conduit or well member 36 extending from above the maximum dense bed level L' to the bottom of the regenerator vessel. An orifice or port 37 is provided in the wall of well member 36 in order to regulate the flow of regenerated catalyst into the stripper. Stripping gas such as air, scrubbed flue gas or nitrogen or the like is supplied at 38 in order to strip off oxygen, carbon oxides and/or water formed during regeneration preparatory to recycling the regenerated catalyst to the reactor or hydroforming side of the system.

The stripped, regenerated catalyst particles are discharged from the base of the stripper well into conduit 39 which form a standpipe for developing fluidstatic pressure necessary to overcome the pressure drop encountered in the transfer of regenerated catalyst to the reactor. The regenerated catalyst may be processed or handled in a variety of ways. It may, for example, be recycled directly to the reactor without pretreatment, i.e. without contact with hydrogen-containing gas prior to its discharge into the reaction zone. Alternatively, the regenerated catalyst may be contacted with hydrogen-containing gas in a separate pretreatment vessel or in a transfer line. In a preferred embodiment as shown in the drawing, the regenerated catalyst is discharged through slide valve or other flow control means into transfer line 41 where it is picked up by recycle gas from line 42 and discharged via inlet line 14 into the bottom of the reactor vessel 10. Since the recycle gas supplied through line 42 is somewhat below ordinary preheat temperature of about 1200° F. as will be pointed out in detail below, it is not essential to design the inlet line 14 and chamber at the bottom of the reactor to limit the residence or pretreat time to the extent necessary when pretreatment of regenerated catalyst at ordinary regeneration temperature of 1100–1200° F. is effected with recycle gas at ordinary preheat temperature of about 1150–1200° F. In the latter case, the residence or pretreat time should be less than fifteen seconds and ordinarily should be about 3 to 5 seconds. Because of the lower temperature of the recycle gas supplied through line 42, the residence time may be 30–60 seconds or more without adverse effect upon the catalyst.

The foregoing operations, with the exception of the use of cooled recycle gas for the transfer and/or pretreatment of regenerated catalyst has been described previously. In accordance with the present invention, a stream of reactor catalyst is subjected to recycling and heating as will now be described. The stream of reactor catalyst for recycling is withdrawn from the reactor and discharged from conduit 22 into U-bend transfer line 24 which serves as a seal into heater-riser 45. Hydrogen-rich gas, which is preferably recycle process gas separated from the liquid reaction products of the process is supplied under pressure through line 46 to heating coils 47 in furnace 48. The preheated gas is discharged via line 48 into the riser leg of U-bend transfer line 24 where it picks up the stream of reactor catalyst and carries the catalyst particles upwardly through heater-riser 45. If desired, a furnace or heat exchanger can be provided around heater-riser 45 in order to supply additional heat to the mixture of reactor catalyst and recycle gas by indirect heat exchange. In view of the higher heat transfer coefficient because of the presence of the solid catalyst particles in the recycle gas stream it is possible to omit the preheat furnace 48 completely and effect the pretreating of the recycle gas in the riser line 45.

The stream of recycle reactor catalyst and recycle gas is discharged from the top of heater riser 45 into a cyclone separator 50 which serves to effect a separation of catalyst particles from recycle gas. The separator 50 can be designed to effect substantially complete separation of catalyst particles from recycle gas. However, in view of the fact that the recycle reactor catalyst is heated only to about 1000° F. in heater riser 45, it is somewhat cooler than the regenerated catalyst and may therefore be advantageously carried overhead with the recycle gas through line 51 for eventual discharge into the stream of freshly regenerated catalyst in inlet line 14. Accordingly, separator 50 may be designed as a rough cut cyclone to separate only about 60–90% of the catalyst solids, the remaining 40 to 10% being carried along by the recycle gas and introduced into the lower part of the reactor.

The heated recycle reactor catalyst separated in 50 passes through dip pipe 52 into hopper 53 and is discharged therefrom through connector line 54 and slide valve 55 or other suitable flow control means into the upper part of the dense fluidized bed of catalyst in the reaction zone. As indicated above, it is preferred to divide the dense fluidized bed in the reactor vessel into two or more zones by arranging one or more horizontal plates 12 which permits flow of catalyst downwardly and vaporous reaction mixture upwardly but restricts the movement of catalyst particles from a lower to a higher reaction zone. Alternatively, perforated plates and downcomers can be arranged in the reactor vessel, the downcomers being arranged to maintain a certain minimum level of catalyst on each plate and to provide a passageway for the discharge of catalyst from one reaction zone to the next lower zone. By introducing heated recycle reactor catalyst to the uppermost reaction zone or bed in sufficient amount, it is possible to maintain a higher average temperature in the uppermost or final reaction zone than is maintained in the lower or initial reaction zone. This is advantageous since the naphthenic constituents of the feed stock can be converted to aromatics under mild conditions in the first reaction zone and the resultant aromatics can be passed without adverse effects through a final reaction zone which is maintained at a somewhat higher temperature to effect conversion of the paraffinic constituents of the feed stock. By operating in this manner, it is possible to obtain higher yields of motor fuels for a given octane number.

The above described arrangement may be modified without departing from the scope of this invention. For example, U-bend transfer lines can be used instead of standpipes and dilute phase risers and vice versa. Moreover, the recycle gas taken overhead from separator 50 can be mixed in whole or in part with the stream of fresh feed to the reactor vessel. Also, as shown in the drawing, the recycle gas passing through line 51 can be passed through valve controlled connector line 56 directly into the reactor. Also, if desired, means may be provided around line 51 or line 56 to supply heat to the recycle gas in the event that the temperature level after heating the recycle reactor catalyst stream is too low.

The following example typifies an operation in accordance with the present invention.

The reactor system which is maintained at a pressure of 200 lbs. per sq. in. is charged with a suitable hydroforming catalyst such as one comprising about 10 wt. percent molybdenum oxide upon a support such as activated alumina or zinc aluminate spinel. The catalyst particles are smaller than 200 microns in diameter with a major proportion between about 20 and 80 microns for proper fluidization. A 200–350° F. boiling range virgin naphtha is preheated to about 1000° F. and is supplied to the distributor ring 16 in the lower part of the reactor vessel. Regenerated catalyst is withdrawn from the regenerator, stripped of combustion products and supplied at a temperature of about 1150° F. to the reactor vessel 10 through transfer line 41 at a rate of about one pound per pound of naphtha charged to the reactor.

Catalyst is continuously withdrawn from the reactor into withdrawal well 20 and thence into line 22 at a rate of about six pounds per pound of naphtha charged to the reactor. Of this six pounds, one pound is discharged into transfer line 26 and conveyed to the regenerator while the remaining five pounds are circulated through the reactor catalyst heater system or riser 45.

Recycle gas is supplied at a rate of about 5000 cu. ft. per barrel of feed and is preheated to a temperature of about 1200° F. in heater coils 47 in furnace 48. The hot recycle gas picks up the recycle reactor catalyst and carries it through the heater-riser 45. The recycle reactor catalyst heated to about 1000° F. is separated from the recycle gas in separator 50 and discharged into the upper part of the reactor at this temperature. The recycle gas at a temperature of about 1000° F. passes overhead from separator 50 through transfer line 51 into the bottom of the reactor vessel.

In order to provide an inverse temperature gradient or higher average temperature in the region where the reactants emerge from the dense catalyst bed, a baffle or perforated plate 13 is arranged within the dense catalyst bed to prevent overall or top to bottom mixing and the amount of recycle gas is increased from about 5000 to about 6500–7000 cu. ft. per barrel of liquid feed. If this does not suffice to establish the desired temperature gradient, a further increase in temperature in the upper or final reaction zone may be obtained by introducing all or part of the freshly regenerated catalyst to the upper zone as by line 60 and valve 61 with a conveying gas such as steam being supplied by line 62 to line 60. It is possible also to increase the temperature in the upper bed by increasing the rate of recycling reactor catalyst as by increasing the recycle rate from five pounds per pound of naphtha feed to seven or eight or more pounds per pound of feed. It is possible to achieve any desired temperature differential in the bed by the use of any one or any combination of these expedients.

The feed or charging stock to the hydroforming reactor may be a virgin naphtha, a cracked naphtha, a Fischer-Tropsch naphtha or the like having a boiling range of from about 125 to 450° F. or it may be a narrow boiling cut within this range. The feed stock is preheated alone or in admixture with recycle gas to reaction temperature or to the maximum temperature possible while avoiding thermal degradation of the feed stock. Ordinarily, preheating of the feed stock is carried out to temperatures of about 800–1000° F., preferably about 950° F. Thermal degradation of the feed naphtha at preheat temperatures can be minimized by limiting the time of residence in the heating coils, transfer and feed inlet lines.

The recycle gas, which contains from about 50 to 70 volume percent hydrogen is preheated to temperatures of about 1150–1200° F. in heating coils 47 in preheat furnace 48. The recycle gas should be circulated through the reactor at a rate of from about 1000 to 8000 cu. ft. per barrel of naphtha feed. The amount of recycle gas added is preferably the minimum amount that will suffice to carry the necessary heat of reaction into the reaction zone and keep carbon formation at a satisfactory low level. The amount of recycle gas circulated to the reactor can be lowered if a heat exchanger or furnace is employed on heater riser 45 or transfer lines 51 and/or 56.

The reactor system is charged with a mass of finely divided hydroforming catalyst particles. Suitable catalysts include platinum or palladium Group VI metal oxides such as molybdenum oxide, chromium oxide, tungsten oxide or vanadium oxide or mixtures thereof upon a carrier such as activated alumina, zinc aluminate spinel or the like. Preferred catalysts contain from about 0.1 to 2.0 wt. percent platinum upon alumina or about 5 to 15 wt. percent molybdenum oxide of from about 10 to 40 wt. percent chromium oxide upon a suitable carrier such as alumina or zinc aluminate spinel. If desired, minor amounts of stabilizers and promoters such as silica, calcium, ceria or potassia can be included in the catalyst. The catalyst particles are, for the most part, between 200 and 400 mesh in size or about 0–200 microns in diameter with a major proportion between 20 and 80 microns.

The hydroforming reactor vessel is operated at temperatures between about 850 and 950° F. When operating with one or more plates or grids and with an inverse temperature gradient, it is preferred to operate the first reaction zone at an average temperature from about 25 to about 75° F. lower than the average temperature in the final reaction zone. A suitable operation, for example, would be one in which the average temperature in the lower or initial reaction zone or in dense bed 12 is about 875° F. and the average temperature in the final reaction zone or dense bed 12a is about 925° F. Small amounts of water vapor are present in the reaction zone due principally to the presence of water in the feed and in the recycle gas and also due to the formation of water in the regeneration as well as in the reduction or pretreatment of the regenerated catalyst. The presence of these small amounts of water permits operation at somewhat higher temperatures without loss in the selectivity than is possible in systems lacking this water partial pressure.

The regenerator vessel is operated at essentially the same pressure as the hydroforming reactor vessel and at temperatures of about 1100–1200° F. The average residence time of the catalyst in the reactor and reactor catalyst recycle system is of the order of from about 3 to 4 hours while the average residence time of the catalyst in the regenerator is of the order of from about 3 to 15 minutes. In some cases, particularly when running high sulfur content feeds, it may be desirable to increase the holding time of the catalyst in the regenerator to a minimum of about ½ hour and up to as long as 4 hours.

The weight ratio of catalyst to oil introduced into the reactor should be about 0.5 to about 3.5. It is preferred to operate at catalyst to oil ratios of about 1 since higher ratios ordinarily tend to give excessive carbon formation. Somewhat higher weight ratios can be used at higher pressures. The internal recirculation or recycling of reactor catalyst through the heater system may vary from 4 or 5 to as high as 8 or 10 pounds per pound of naphtha charged to the reactor.

Space velocity or the weight in pounds of feed charged per hour per pound of catalyst in the reactor depends upon the age or activity level of the catalyst, the character of the feed stock and the desired octane number of the product. Space velocity for a molybdenum oxide on alumina gel catalyst may vary, for example, from about 1.5 wt./hr./wt. to about 0.15 wt./hr./wt.

The foregoing description contains a limited number of embodiments of the present invention. It will be understood, however, that this invention is not limited thereto since numerous variations are possible without departing from the scope of this invention.

What is claimed is:

1. In a process for reforming hydrocarbons boiling within the motor fuel range in contact with finely divided reforming catalyst particles in a reaction zone maintained at temperatures of from 850–950° F. and at elevated pressures of up to about 1000 lbs. per sq. inch, in accordance with the fluidized solids technique, the improvement which comprises continuously withdrawing a stream of catalyst particles from a dense, fluidized bed in the reaction zone, transferring a minor portion of the withdrawn catalyst particles to a regeneration zone, burning inactivating carbonaceous deposits from the catalyst particles in the regeneration zone, recycling the regenerated catalyst particles to the reaction zone, mixing the remainder or major proportion of the withdrawn catalyst particles with hot recycle gas in order to raise the temperature of the catalyst particles well above the average catalyst temperature in the reactor, separating the heated catalyst particles from the recycle gas, and separately introducing the heated, recycle catalyst particles and recycle gas into the reforming reaction zone.

2. In a process for reforming hydrocarbons boiling within the motor fuel range in contact with finely divided reforming catalyst particles in a reaction zone maintained at temperatures of from 850–950° F. and at elevated pressures of up to about 1000 lbs. per sq. inch, in accordance with the fluidized solids technique, the improvement which comprises continuously withdrawing a stream of catalyst particles from a dense, fluidized bed in the reaction zone, transferring a minor portion of the withdrawn catalyst particles to a regeneration zone, burning inactivating carbonaceous deposits from the catalyst particles in the regeneration zone, recycling the regenerated catalyst particles to the reaction zone, mixing the remainder or major proportion of the withdrawn catalyst particles with hydrogen-rich recycle gas at temperatures of about 1150–1200° F. in order to raise the temperature of the catalyst particles to about 1000° F., separating the heated catalyst particles from the recycle gas, and separately introducing the heated recycle catalyst particles and recycle gas into the reforming reaction zone.

3. The process as defined in claim 1 in which the dense, fluidized bed in the reactor is divided into at least two zones through which the feed naphtha and recycle gas pass successively and the catalyst particles are withdrawn from the zone first contacted by the naphtha and recycle gas and the hot recycle reactor catalyst particles are returned to the zone last contacted by the naphtha and recycle gas.

4. The process as defined in claim 1 in which the dense, fluidized bed in the reactor is divided into at least two zones through which the feed naphtha and recycle gas pass successively and the catalyst particles are withdrawn from the zone first contacted by the naphtha and recycle gas and the hot recycle reactor catalyst particles and the hot, freshly regenerated catalyst particles are returned to the zone last contacted by the naphtha and recycle gas.

5. The process as defined in claim 1 in which the catalyst is a group VI metal oxide upon a carrier, the dense, fluidized bed in the reactor is divided into at least two zones through which the feed naphtha and recycle gas pass successively and the catalyst particles are withdrawn from the zone first contacted by the naphtha and recycle gas and the hot recycle reactor catalyst particles and the hot, freshly regenerated catalyst particles are returned to the zone last contacted by the naphtha and recycle gas.

6. The process as defined in claim 2 in which the dense, fluidized bed in the reactor is divided into at least two zones through which the feed naphtha and recycle gas pass successively and the catalyst particles are withdrawn from the zone first contacted by the naphtha and recycle gas and the hot recycle reactor catalyst particles are returned to the zone last contacted by the naphtha and recycle gas.

7. The process as defined in claim 2 in which the dense, fluidized bed in the reactor is divided into at least two zones through which the feed naphtha and recycle gas pass successively and the catalyst particles are withdrawn from the zone first contacted by the naphtha and recycle gas and the hot recycle reactor catalyst particles and the hot, freshly regenerated catalyst particles are returned to the zone last contacted by the naphtha and recycle gas.

8. The process as defined in claim 2 in which the catalyst is a group VI metal oxide upon a carrier, the dense, fluidized bed in the reactor is divided into at least two zones through which the feed naphtha and recycle gas pass successively and the catalyst particles are withdrawn from the zone first contacted by the naphtha and recycle gas and the hot recycle reactor catalyst particles and the hot, freshly regenerated catalyst particles are returned to the zone last contacted by the naphtha and recycle gas.

9. In a process for reforming hydrocarbons boiling within the motor fuel range in contact with finely divided reforming catalyst particles in a reaction zone maintained at temperatures of from 850° to 950° F. and at elevated pressures of up to about 1,000 lbs. per sq. inch, in accordance with the fluidized solids technique, said reaction zone being divided into at least two zones through which said hydrocarbons along with hydrogen containing recycle gas separated from the reaction products pass successively, the improvement which comprises continuously withdrawing a stream of catalyst particles from a dense, fluidized bed in the zone first contacted by said hydrocarbons and recycle gas, mixing the withdrawn catalyst particles with hot recycle gas in order to raise the temperature of the catalyst particles well above the average catalyst temperature in the reactor, separating the heated catalyst particles from the recycle gas, and separately introducing recycle gas thus contacted into the zone first contacted by said hydrocarbons and the catalyst so heated into the zone last contacted by said hydrocarbons.

10. In a process for reforming hydrocarbons boiling within the motor fuel range in contact with finely divided reforming catalyst particles in a reaction zone maintained at temperatures of from 850° to 950° F. and at elevated pressures of up to about 1,000 lbs. per sq. inch, in accordance with the fluidized solids technique, said reaction zone being divided into at least two zones through which said hydrocarbons along with a hydrogen-rich recycle gas separated from the reaction products pass successively, the improvement which comprises continuously withdrawing a stream of catalyst particles from a dense, fluidized bed in the zone first contacted by said hydrocarbons and recycle gas, mixing the withdrawn catalyst particles with hydrogen-rich recycle gas at temperatures of about 1150° to 1200° F. in order to raise the temperature of the catalyst particles to about 1000° F., separating the heated catalyst particles from the recycle gas, and separately introducing the hydrogen-rich recycle gas so contacted into the zone first contacted by said hydrocarbons and the catalyst so heated into the zone last contacted by said hydrocarbons.

References Cited in the file of this patent

UNITED STATES PATENTS

| | | |
|---|---|---|
| 2,345,487 | Liedholm | Mar. 28, 1944 |
| 2,459,836 | Murphree | Jan. 25, 1949 |
| 2,479,110 | Haensel | Aug. 16, 1949 |
| 2,488,030 | Scheineman | Nov. 15, 1949 |
| 2,541,077 | Leffer | Feb. 13, 1951 |
| 2,602,771 | Munday et al. | July 8, 1952 |
| 2,656,304 | McPherson et al. | Oct. 20, 1953 |